United States Patent [19]
Ichiyanagi

[11] 3,779,633
[45] Dec. 18, 1973

[54] ELECTROMAGNETIC SHUTTER RELEASING DEVICE FOR A PHOTOGRAPHIC CAMERA

[75] Inventor: Toshikazu Ichiyanagi, Tokyo, Japan
[73] Assignee: Canon Kabushiki Kaisha, Tokyo, Japan
[22] Filed: Dec. 23, 1971
[21] Appl. No.: 211,347

[30] Foreign Application Priority Data
  Dec. 28, 1970  Japan.............................. 45/128435

[52] U.S. Cl. .............. 352/204, 95/53 EA, 352/177, 352/219
[51] Int. Cl. ............................................. G03b 9/10
[58] Field of Search ..................... 95/31 EL, 53 EA; 352/174, 175, 176, 177, 169, 210, 219, 204

[56] References Cited
UNITED STATES PATENTS

| | | | |
|---|---|---|---|
| 3,603,678 | 9/1971 | Anderl | 352/177 X |
| 3,020,816 | 2/1962 | Frenk | 95/53 EA UX |
| 3,434,405 | 3/1969 | Friedman | 95/31 EL |
| 3,597,061 | 8/1971 | Stieringer | 352/177 X |
| 3,602,584 | 8/1971 | Anderl | 352/174 |
| 3,609,456 | 9/1971 | Kayaguchi | 95/31 EL |

*Primary Examiner*—Samuel S. Matthews
*Assistant Examiner*—E. M. Bero
*Attorney*—William R. Woodward

[57] ABSTRACT

An electromagnetic shutter releasing device which includes an electromagnet controlled by an electrical input pulse for electromagnetically releasing a movable shutter from its stationary position for exposure, a permanent magnet interacting with said electromagnet, the polarity of said electrical input to the electromagnet being changed to interact with the permanent magnet to stop or start a motor for driving the shutter shaft. For continuous shooting, the motor is kept driven without applying the electrical input to the electromagnet. The shutter releasing device further incorporates an electronic control circuit including a multivibrator which can respond quickly and correctly to the electrical input pulses.

9 Claims, 8 Drawing Figures

PATENTED DEC 18 1973

INVENTOR:
TOSHIKAZU ICHIYANAGI
BY W.R.Woodward
ATTORNEY

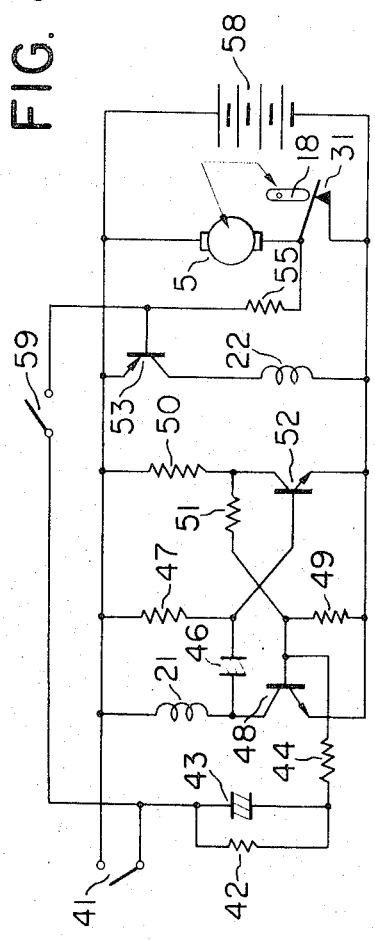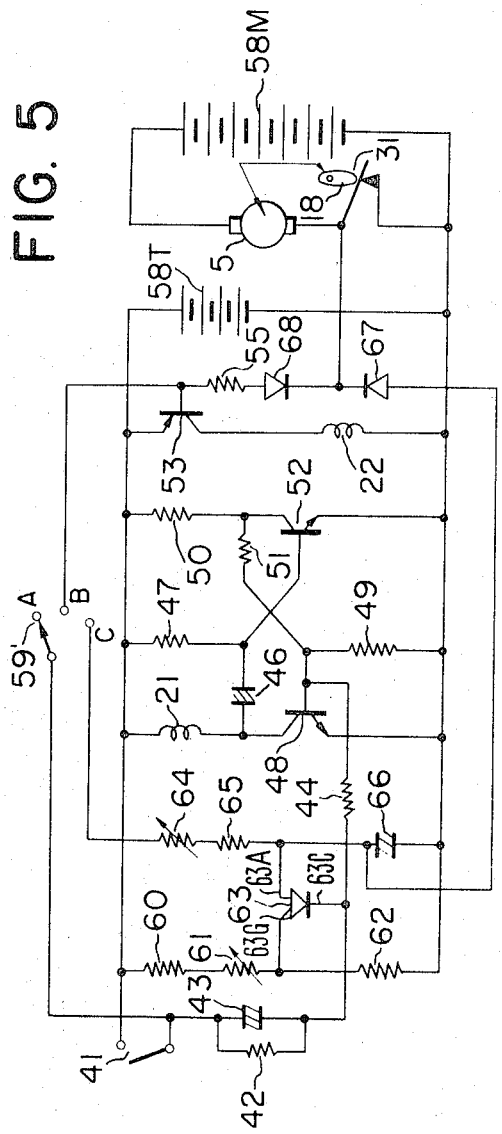

ELECTROMAGNETIC SHUTTER RELEASING DEVICE FOR A PHOTOGRAPHIC CAMERA

BACKGROUND OF THE INVENTION

1. Field of the Invention

The present invention relates generally to an electromagnetic shutter releasing device for photographic cameras, and more particularly an electromagnetic shutter releasing device for photographic cameras which enables a single shot, a continuous shot, or an intermittent to be made selectively by use of a timer in a simple operation, and which incorporates therein an electronic control circuit which can response quickly to the shutter release signal.

2. Description of the Prior Art

In the photographic cameras such as motion picture cameras, the shutter release button is generally kept depressed a continuous shot, whereas by depressing and immediately releasing the shutter release button, an appropriate selection means is switched to produce a single shot. In either case, if the shutter blade driving motor is not correctly started or stopped, the shutter blade is stopped at a position at which the aperture is not completely closed. There arise many problems when the current flows even when the motor is stopped. To overcome these problems, the following steps must be accomplished sequentially:

1. the shutter release switch is closed;
2. the stopper in engagement with the driving motor shaft must be released;
3. the driving motor starts to rotate after the motor circuit is established;
4. the released stopper must be held in a released position and the motor circuit must be kept closed to continue the rotation of the motor;
5. the motor circuit is opened, and the stopper must return to its initial position;
6. the shutter blade driving shaft must be stopped at a correct position by the engagement of the stopper with the notched or projected portion of the driving shaft.

In accomplishing these steps correctly, there have been the following problems:

1. the power consumption is increased when the motor circuit is kept closed;
2. erratic operations tend to occur when many switches are involved; and
3. the shutter release device cannot respond quickly to the shutter release signals.

More particularly, in order to accomplish the item (4) of the shutter release operation for holding the stopper disengaged from the rotary shaft of the motor for continuous shooting, the electromagnet must be kept energized so that the power consumption is increased too much for a limited power source incorporated in a photographic camera.

The electromagnetic shutter releasing device disclosed in German Offenlegungsschrift No. 1,927,733 is of the type in which one electromagnet is kept energized to control a reversible motor for continuous shooting. German Offenlegungsschrift No. 1,948,674 discloses an electromagnetic shutter release device of the type in which a large current is made to flow through one of the two electromagnets to release a stopper from a rotary shaft of a shutter blade driving motor. and a small current is made to flow through the other electromagnet to hold the stopper in a released position for continuous shooting. However, when the continous shot becomes longer, the power consumption is increased too much for a limited power supply source of the camera which is generally a battery. Therefore, the outdoor shooting becomes inconvenient.

The above three problems cannot be overcome by the prior art electromagnetic shutter releasing devices which in general employ a monostable multivibrator, a bistable multi-vibrator or the like, which is too slow to respond to a shutter releasing signal of the order of less than one milisecond.

SUMMARY OF THE INVENTION

One of the objects of the present invention is therefore to provide an electromagnetic shutter releasing device in which a stopper, which is used to control a shutter blade driving shaft to stop at a predetermined position, is held in a released position for continuous shooting under the interaction between a permanent magnet and an electromagnet without flow of current through said electromagnet; and an electronic circuit is provided which makes the shutter releasing device respond quickly to the shutter release signal.

Another object of the present invention is to provide an electromagnetic shutter releasing device in which the electrical input pulses with the polarities reversed are applied alternately to the electromagnet; the attraction or repellence between the permanent magnet and the electromagnet is detected to actuate switching means for opening or closing a circuit for the shutter blade driving motor for single or continuous shot; and an electronic circuit is incorporated which makes the electromagnetic shutter releasing device respond quickly to the shutter release signal.

Another object of the present invention is to provide an electromagnetic shutter releasing device in which a driving coil for releasing the stopper from the shutter blade driving shaft is connected as a load of a monostable multivibrator.

Another object of the present invention is to provide an electromagnetic shutter releasing device in which a driving coil for releasing the stopper from the shutter blade driving shaft is connected as a load of a bistable multivibrator.

Another object of the present invention is to provide an electromagnetic shutter releasing device in which a stopper, which is used to control a shutter blade driving shaft to stop at a predetermined position, is held in a released position for continuous shooting under the interaction between a permanent magnet and an electromagnet; an electronic circuit is incorporated which makes the shutter releasing device respond quickly to the shutter release signal; and timer means is further incorporated for permitting single shots intermittently, whereby a single shot, a continuous shot or intermittent single shots (time-lapse cinematography) can be selected by a single shutter releasing device.

The above and other objects, features and advantages of the present invention will become more apparent from the following description of the preferred embodiments thereof taken in conjunction with the accompanying drawings.

BRIEF DESCRIPTION OF THE DRAWINGS

FIG. 2b is a side view thereof looking in the direction indicated by the arrows B of FIG. 2a;

FIG. 3a is a sectional view, in shutter release position, of the electromagnetic shutter releasing device shown in FIG. 2a;

FIG. 3b is a sectional view thereof looking in the direction indicated by the arrows B of FIG. 3a;

FIG. 4 is a circuit diagram of an electronic circuit for controlling the electromagnetic shutter releasing device shown in FIGS. 1–3;

FIG. 5 is a diagram of a variation of the electronic circuit shown in FIG. 4 incorporating therein a timer means.

DESCRIPTION OF THE PREFERRED EMBODIMENTS

Figure 1:
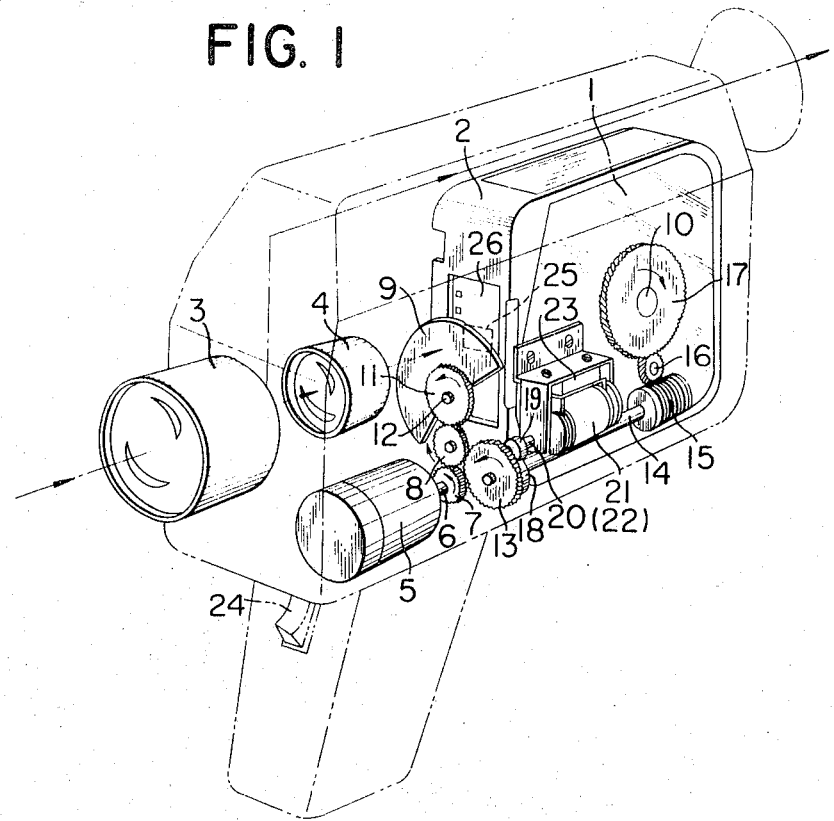
FIG. 1 is a perspective view of a prior art motion picture camera to which is applied one embodiment of an electromagnetic shutter releasing device in accordance with the present invention.

Referring to FIG. 1 illustrating an electromagnetic shutter release device in accordance with the present invention incorporated in a prior art motion picture camera, a camera body 1 is designated by the two-dot chain lines, and has a film magazine 2 mounted therein. A zoom lens 3 and a relay lens 4 form an optical system well known in the art. A shutter blade 9 and a film winding shaft 10 are rotated by a driving motor 5 coupled to a power source (not shown) through a gear 7 carried by a rotary shaft 6 of the motor 5, an intermediate gear 8 in mesh with the gear 7 and with a gear 11 carried by a shutter blade shaft 12 of the shutter blade 9. A gear 13 carried at one end of a driving shaft 14 is in mesh with the intermediate gear 8, and a worm gear 15 carried at the other end of the driving shaft 14 is in mesh with a worm wheel 16 which in turn is in mesh with a gear 17 carried by the rotary shaft 10 for film winding. Thus the film winding shaft 10 is rotated in the direction indicated by the arrow as the motor 5 is driven.

A cam 18 to be described in more detail hereinafter is carried by the driving shaft 14 adjacent to the gear 13, and a cam follower or stopper 19 carried by a sliding rod 20 is releasably in engagement with the cam 18. Electromagnetic coils 21 and 22 wound in opposite directions are mounted upon the sliding rod 20. A permanent magnet 23 is mounted to a first yoke 27. Upon depression of a shutter release button 24, the shutter blade 9 is rotated, and the film winding shaft 10 is also rotated for a one frame shot or continuous shooting, as will be described in more detail hereinafter.

Light from a subject is incident to the zoom lens 3 as indicated by the chain lines, and is directed into two directions by a light splitter (not shown) after light has passed through the zoom lens 3. One light beam passes through the relay lens 4 and an aperture 25 indicated by the dashed lines to expose a film 26 in the magazine 2. The other light beam reaches a viewfinder along the path indicated by the chain line.

Figure 2A:
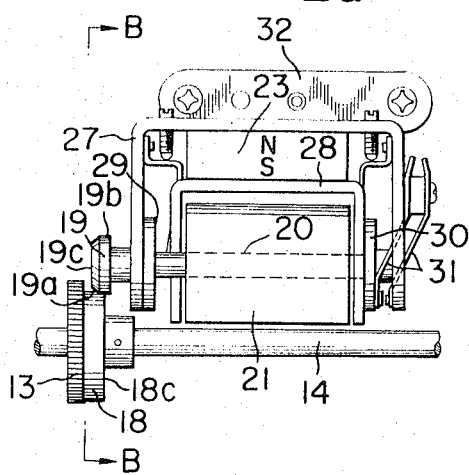
FIG. 2a is a front view of one embodiment of an electromagnetic shutter releasing device in accordance with the present invention.
Figure 2B:
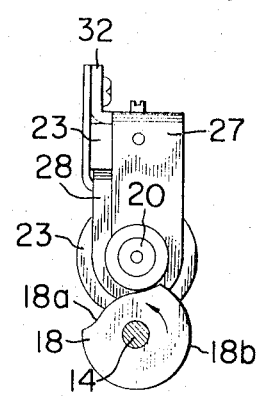
Figure 3A:
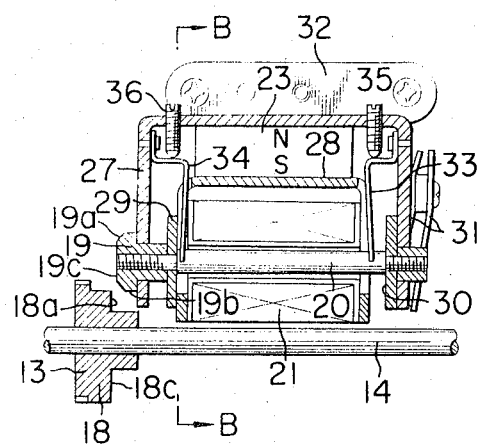

Next reference is made to FIGS. 2a, 2b and 3a and 3b and the first embodiment of an electromagnetic shutter release device in accordance with the present invention will be described. Referring particularly to FIGS. 2a and 3a, the permanent magnet 23 is mounted on the first yoke 27, whereas the electromagnetic coil 21 is mounted on a second yoke 28 which is held in close contact with the permanent magnet 23 to provide a magnetic path. The sliding rod 20 also functions as a core of the electromagnetic coil 21, and is slidably supported by the first and second yokes 27 and 28. The sliding rod 20 carries members 29 and 30 made of ferromagnetic material between the first and second yokes 27 and 28. The stopper 19 affixed to the one end of the sliding rod 20 has a sloping or tapered surface 19a, a side surface 19b and an end face 19c. A switch 31 to be actuated in a manner to be described hereinafter in detail serves to open and close the circuit of the motor 5 for rotating the shutter blade 9. The cam 18 is carried by the driving shaft 14 which is rotated at the same rotational speed to that of the shutter blade shaft 12, and is provided with a notched cam surface 18a, an arcuate cam surface 18b as shown in FIG. 2b, and an inner end face 18c (See FIG. 2a). The electromagnetic shutter release device with the construction described above is mounted on a support 32 which in turn is securely fixed to the camera body 1.

In FIGS. 2a and 2b, the stopper 19 is in engagement with the cam 18, and the switch 31 is opened so that the electromagnetic coil 21 is not energized. The ferromagnetic members 29 and 30 are attracted by the first and second yokes 27 and 28, respectively, so that the driving shaft 14 is locked; that is, the shutter shaft 12 and hence the shutter blade 9 are stopped.

When the electromagnetic coil 21 is energized in such a manner that an N pole is induced on the side of the ferromagnetic member 29 whereas an S pole is induced on the side of the ferromagnetic member 30, the ferromagnetic members 29 and 30 are repelled away from the first and second yokes 27 and 28, respectively. As a result, the sliding rod 20 is displaced toward the right to close the switch 31, whereas the side surface 19b of the stopper 19 is released away from the end face 18c of the cam 18, but the tapered surface 19a of the stopper is till in engagement with the end face 18c. Thus, the motor 5 as shown in FIG. 1 is driven, and the driving shaft 14 is rotated.

Figure 3B:
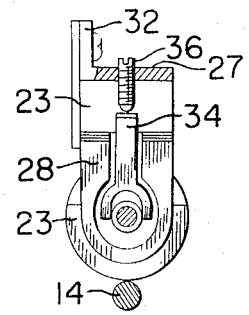

The sliding rod 20 is further displaced until the ferromagnetic members 29 and 30 are attracted by the second and first yokes 28 and 27, and are made into contact therewith as shown in FIGS. 3a and 3b. Therefore, even when the electromagnetic coil 21 is de-energized, the sliding rod 20 remains in this position under the attraction between the ferromagnetic members 29 and 30 and the yokes 28 and 27, respectively.

When the current flow in the electromagnetic coil 21 is reversed, the polarity is reversed so that the ferromagnetic members 29 and 30 are repelled away from the second and first yokes 28 and 27 respectively, so that the sliding rod 20 is displaced to the left to open the switch 31. However, in general, the arcuate cam surface 18b is in the position for engagement with the stopper 19. As a result, when the stopper 19 is displaced to the left, the left end face 19c of the stopper comes into engagement with the right end face 18c of the cam 18. With the cam in this position, the switch 31 is not opened. The switch 31 is opened only when the cam 18 rotates in the direction indicated by the arrow in FIG. 2b to the position where the stopper 19 is permitted to displace further to the left until the tapered surface 19a thereof engages with the notched cam surface 18a of the cam 18. Thus, the motor circuit is opened to stop the motor 5, but because of the intertia, its rotation is continued until the side face 19b of the stopper 19 engages with the notched cam surface 18a of the cam 18, as shown in FIGS. 2a and 2b, so that the motor and hence the driving shaft 14 are stopped in that position.

When the electromagnetic shutter release device is actuated in the manner described above, one frame shooting becomes possible. When the motor 5 is kept energized while the stopper is disengaged from the cam 18, continuous shooting becomes possible, and is stopped when the electromagnetic coil 21 is energized with the reversed polarity in the manner described above. The shutter blade shaft can be stopped at its normal position.

In some cases, the ferromagnetic members 29 and 30 are too strongly attracted by the yokes 27 and 28 under the force of the permanent magnet 23 so that they are difficult to be moved away only under the force induced by the electromagnetic coil. To overcome this problem, springs 33 and 34 whose forces can be adjusted by adjusting screws 35 and 36, respectively, are disposed so that the ferromagnetic members 29 and 30 may be readily moved away from the yokes 27 and 28, respectively, Next referring to FIG. 4, the electric circuit for controlling the operation of the electromagnetic shutter release device of the type described above, will be described. A shutter release switch 41 is actuated to establish the circuit when the shutter release button is depressed. Reference numeral 58 designates a power source; 42, 44, 47, 49, 50, 51 and 55, resistors; 43, and 46, electrolytic capacitors; 48 and 52, NPN transistors respectively; and 53, a pnp transistor. The electromagnetic coils 21 and 22 described hereinbefore with reference to FIGS. 1–3, are energized to disengage the stopper away from the cam 18 and to engage the stopper with the cam 18 again, respectively. The directions of the windings of the electromagnetic coils 21 and 22 are opposite. When the switch 31 is closed by the cam 18 in the manner described hereininbefore, the motor 5 is driven. It is seen that the coil 21, the capacitor 46, the resistors 49, 50, and 51, and the transistors 48 and 52 constitute a monostable multivibrator.

Next the mode of operation of FIG. 4 will be described. When the shutter release switch 41 is closed, current flows through the capacitor 43 and the resistor 44, whereby the transistor 48 is turned on for a time which is determined by the capacitor 43 and the resistor 44. The resistor 42 is provided for discharging the capacitor 43 when the release switch 41 is opened. The potential at the collector of the transistor 48 is reduced, and the current flows through the coil 21. The base potential of the transistor 52 is decreased so that the transistor 52 is turned off, and its collector potential is increased. The base current from the transistor 48 flows through the resistor 51 so that the transistor 48 remains on. When the capacitor 46 is charged through the resistor 47, the base potential of the transistor 52 rises, and the transistor 52 is turned on. Then, the collector potential of the transistor 52 is lowered, and the current flow through the resistor 51 is reduced. As a result, the transistor 48 is turned off, and the collector potential of the transistor 48 is increased. Therefore, no current flows through the coil 21. Therefore, the time T1 during which the current flows through the coil 21 is dependent upon the time constant determined by the resistor 47 and the capacitor 46, independently of the duration of the signal from the switch 41 which varies from the order of less than 1 millisecond to the order of longer than 10 seconds.

The current flows through the coil 21 for the time interval T1, and the sliding rod 20 is displaced from the position shown in FIG. 2b to the position shown in FIG. 3b in the manner described hereinbefore under the interaction of the electromagnetic coil 21 and the permanent magnet 23. As a result, the stopper 19 is disengaged from the cam 18, and the switch 31 is closed to start the motor 5.

Since the base current of the transistor 53 flows through the resistor 55, the transistor 53 is turned on, and the current flows through the coil 22. As a result, under the interaction between the coil 22 and the permanent magnet 23, the sliding rod 20 receives a force to be returned to the initial position, and the switch 31 is opened when the tapered surface 19a of the stopper 19 engages with the notched cam surface 18a of the cam 18. Therefore the motor 5 is stopped after one frame has been exposed. The resistor 55 is inserted in order to limit the base current, When the continuous-shot switch 59 is closed, the path between the emitter and base of the transistor 53 is short-circuited until the shutter release switch 41 is opened so that the base voltage is zero. As a result, the transsistor 53 is turned off, and no current flows through the coil 22. Therefore, while the motor 5 is driven, the sliding rod 20 remains in the position indicated in FIG. 3a to keep the switch 31 closed. Therefore, the shutter blade 9 keeps its rotation around the shaft 12 while the film is transported continuously for continuous shooting in syncronism with the not shown film feeding mechanism. To stop continuous shooting, the shutter release button 24 (See FIG. 1) is released to open the shutter release switch 41. Then the base current flows from the transistor 53 through the resistor 55 so that the transistor 53 is turned on, and the current flows through the coil 22. As a result, the switch 31 is opened as in the case of the one-frame shooting, and the motor 5 is stopped when the stopper 19 engages with the cam 18 in the manner described hereinbefore.

In the circuit shown in FIG. 4, no current is required to maintain the stopper 19 disengaged from the cam 18, and only one switch 31 is closed for exposure so that the erratic operation can be minimized.

In the circuit shown in FIG. 5, independent power sources 58T and 58M are provided for a timer and the motor, and the coil 21 for disengaging the stopper 19 from the cam 18 is inserted as the load of the monostable multivibrator constituted with elements 46, 47, 49, 50, 51 and 52. Elements common in the circuits shown in FIGS. 4 and 5 are designated by same reference numerals, and the mode of operation of the circuit shown in FIG. 5 is similar to that of the circuit shown in FIG. 4. In FIG. 5, 60, 62, and 65 are resistors; 61 and 64, variable resistors; 66, an electrolytic capacitor; 63, a programmable double-base diodes; and 67, and 68 are diode. When the movable arm of the switch 59' is brought into contact with the fixed contact A, one-frame shooting is made, whereas the movable arm is made into contact with the fixed contact B, continuous shooting is made. It is seen that switching of movable arm of the switch 59 between the fixed contacts A and B corresponds to opening and closing of the switch 59 shown in FIG. 4.

When the movable arm of the switch 59' is put into contact with the fixed contact C, the timer circuit comprising the elements 60, 61, 62, 64, 65, and 66 and the programmable double-base diode 63, is actuated to drive the motor 5 at a predetermined time interval, thereby permitting intermittent exposures or time-lapse cinematography as will be described in more detail hereinafter.

When the switch 41 is closed, the capacitor 66 is charged through the variable and fixed resistors 64 and 65. The gate terminal 63G of the programmable double-base diode 63 which has the anode and cathode terminals 63A and 63C is maintained at a predetermined voltage level through the resistor 60, the variable resistor 61 and the resistor 62. When the voltage at the anode terminal 63A becomes higher than that at the gate terminal 63G, the current flows from the anode to cathode terminals 63A and 63C until the potential at the anode terminal 63A is sufficiently lowered. When the potential at the anode terminal 63A is sufficiently lowered, no current flows from the anode terminal 63A to the cathode terminal 63C, and the charging of the capacitor 66 is started.

So long as the current flows from the anode terminal 63A of the programmable double-base diode 63 to the cathode terminal 63C, the base current of the transistor 48 flows through the resistor 44, and the monostable multivibrator is actuated in the manner described hereinbefore with reference to FIG. 4. As a result, the stopper is disengaged from the cam 18, and the switch 31 is closed to drive the motor 5.

When the timer circuit including the programmable double-base diode is used, the cathode terminal 63C of the programable double-base diode 63 is maintained at a low voltage level while the capacitor 66 is charged during a time T2 dependent upon the variable and fixed resistors 64 and 65 and the capacitor 66. As a result the transistor 48 is kept turned off, and the motor 5 is not driven. After the time interval T2 the current starts to flow from the anode terminal 63A of the diode 63 to the cathode terminal 63C, and the voltage at the cathode terminal 63C is raised so that the transistor 48 is turned on. As a result, the stopper 19 is released from the cam 18, and the switch 31 is closed to drive the motor. After the single shot, the motor 5 is stopped.

The timer circuit generates the shutter release signals at the predetermined time interval T2, and in response to this signal, the monostable multivibrator is actuated to drive the motor 5 in order to take the single shot. Thus, the single shots can be taken at a predetermined time interval.

Since the diode 67 discharges the capacitor 66 when the switch 31 is closed, the capacitor 66 is charged always with a predetermined potential; that is, the forward voltage across the diode 67. Therefore, the time interval T2 can be controlled with a higher degree of accuracy.

The diode 68 is inserted in order to prevent the current from flowing into other circuits than the motor circuit.

Since the timer circuit of the type described is incorporated, the process of flower blooming which is very slow, can be recorded, and can be reproduced in a shorter time.

Figure 6:
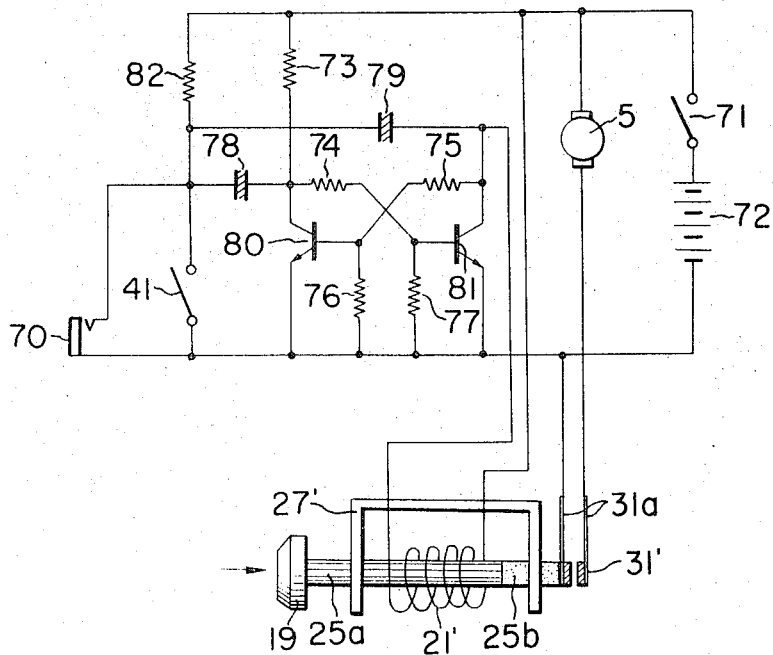
FIG. 6 is a diagram of another variation of the circuit shown in FIG. 4 incorporating a bistable multivibrator.

A variation of the circuit shown in FIG. 4 is illustrated in FIG. 6, in which in place of the monostable multivibrator, a bistable multivibrator is employed, and the sliding rod, the yokes and the switch 31 described with reference to FIGS. 2 and 3 are modified to some extent. In FIG. 6, the stopper 19, the portion 25a of the sliding rod, and the yoke 27' are made of magnetic materials as in the case of the embodiment shown in FIGS. 2 and 3, but the portion 25b of the sliding rod is made of nonmagnetic material. Therefore when the coil 21' is energized, the portion 25a of the sliding rod and the stopper 19 are displaced in the direction in which the self-inductance of the coil 21' is increased (as indicated by the arrow in FIG. 6), whereby the switch 31 is closed. When the coil 21' is deenergized, the contacts of the switch 31 are moved away from each other under the forces of elastic members 31a attached thereto. Thus, the switch 31 is opened as shown in FIG. 6. It is of course possible to employ the arrangement of the ferromagnetic members and the yokes shown in FIGS. 2 and 3.

In FIG. 6, reference numerals 73, 74, 75, 76, 77 and 82 designate resistors; 80 and 81 npn transistors; 71, a switch of a power source 72; 41, a shutter release switch, 5, the driving motor; 78 and 79, electrolytic capacitors; and 70, a jack for connection with a remote control unit, a timer or electronic computer.

Next the mode of operation will be described. When the main switch 71 is closed, the transistor 81 is turned off, and no large current flows through the coil 21'. The base current of the transistor 80 flows through the resistor 75, the transistor 80 is turned on, and its collector potential is lowered. As a result, the base current of the transistor 81 does not flow through the resistor 74, the transistor 81 remains turned off. Next when the switch 41 is closed, the collector voltages of the transistor 80 and 81 are lowered. Since the collector voltage of the transistor 80 is maintained at a lower level, the base voltage of the transistor 81 remains also at a lower level. When the collector voltage of the transistor 81 is lowered, the base voltage of the transistor 80 is lowered so that the transistor 80 is turned off. Then the collector voltage of the transistor 80 reaches a high level so that the base voltage of the transistor 81 also reaches a high leverl. As a result, the transistor 81 is turned on so that the large current flows through the coil 21', and the switch 31' is closed to start the motor 5. Even when the switch 41 is opened, and the current flows into the collectors of the transistors 80 and 81 through the capacitors 78 and 79, the collector voltage of the transistor 80 remains at a high level because the transistor 80 is turned off. As a result, the transistor 81 remains turned on, and the charges accumulated on the capacitor 79 flows into the transistor 81 while the collector voltage of the transistor 81 remains at a low level. Since the time interval the current flows through the capacitors 78 and 89 is very short, (of the order of less than 1 millisecond), the bistable multivibrator responds to a very short pulse (of the order of less than one millisecond) from a device connected to the jack 70, which is equivalent to the opening and closing of switch 41.

When the shutter release switch 41 is closed again, the current flows through the capacitors 78 and 79 so that the collector voltages of the transistors 80 and 81 are lowered. Since the collector voltage of the transistor 81 has been at a lower level, the base voltage of the transistor 80 remains at a lower level. Since the collector voltage of the transistor 80 has been at a high level, the base voltage of the transistor 81 changes from a high to a lower level. Therefore the transistor 81 is tuned off. Then the collector voltage of the transistor 81 is raised, and the base current of the transistor 80 flows through the resistor 75 to turn on the transistor 80. Even when the shutter release switch 41 is opened so that the current flows through the capacitors 78 and 79 into the transistors, the transistor 80 remains turned on so that the collector voltage thereof remains at a low level, whereas the collector voltage of the transistor 81 remains at a high level. As described above, the time interval the current flows through the capacitors 78 and 79 is extremely short (of the order of less than one milisecond) the bistable multivibrator can respond to a narrow release pulse signal (of the order of less than one millisecond) from a timer, computer, etc, connected to the jack 70 parallely connected to the switch 41; instead of closing the switch 41. In other words, it is possible to provide the equivalent operation to the release signal from the release switch 41 by the pulse signal coming from the jack.

The circuit of the type just described including a, bistable multivibrator, can drive the motor for a photographic camera in response to one input pulse of extremely short duration from an electronic computer or the like, and the camera can continue shooting even after the pulse disappears, under the action of the bistable multivibrator. The motor can be stopped in response to the next pulse from the computer or the like. That is, the start and stop of the driving motor can be controlled in response to the pulses of extremely short duration. This arrangement is particularly advantageous with time-sharing operation of the computer.

I claim:

1. An electro magnetic shutter releasing device for use in a photographic camera for releasing a movable shutter from a stationary closed position so that it can be opened for exposure, comprising:
   a source of electric energy;
   a shutter driving means, including an electric motor switchably connected to said source, and a shaft for moving said shutter;
   blocking means which can assume a first position wherein it holds the shutter in its stationary closed position and which is movable to a second position wherein the shutter is released and said source of electric energy is connected to said motor;
   permanent magnet latching means for holding said blocking means in said first and second positions;
   electromagnetic means having an element for actuating said blocking means, said electromagnetic means having a first energized state wherein said element moves said blocking means to said second position for unblocking said shutter and releasing it for movement and for simulataneously connecting the electric energy source to said motor, and having also a second energized state for moving said blocking means to said first position;
   control means including a shutter release switch and a control circuit interconnecting said electromagnetic means, said shutter release switch and said source, said control means energizing and deenergizing said electromagnetic means, said control means further comprising a multivibrator having at least one stable state, said multivibrator being connected to said shutter release switch and to said electromagnetic means and being arranged in said circuit so as to be set by the closing of said shutter release switch to generate an output signal for a predetermined time to produce said first energized state for unblocking said shutter and to generate a resetting pulse for producing said second energized state for blocking said shutter.

2. An electromagnetic shutter releasing device as set forth in claim 1 wherein said multivibrator is a monostable multivibrator and in which said electromagnetic means holds said blocking means in its first position after a conclusion of a cycle of said monostable multivibrator said a resetting pulse from said control means being responsive to the energized condition of said motor followed by indexing of said shaft to the stationary closed position of said shutter and wherein further a continuous-shooting-mode switch is provided and connected in said control circuit for disabling the resetting of said electromagnetic means so long as said shutter release switch is actuated.

3. An electromagnetic shutter releasing device for releasing a movable shutter from a stationary closed position so that it can be opened for exposure, comprising:
   a source of electric energy;
   shutter driving means including an electric motor switchably connected to said source and a shaft;
   blocking means which can assume a first position wherein it holds the shutter in its stationary closed position and which is movable to a second position wherein the shutter is released and said source of electric energy is connected to said motor;
   electromagnetic means having an element for actuating said blocking means, said electromagnetic means having a first energized state wherein said element moves said blocking means to said second position for unblocking said shutter and releasing it for movement and for simultaneously connecting the electric energy source to said motor, having also a deenergized state during which said blocking means is maintained in said second position, and having also a second energized state for moving said blocking means to said first position;
   control means including a shutter release switch and a continuous mode operation switch and control circuits interconnecting said source, said electromagnetic means and said switches, and further including a monostable multivibrator for providing a setting energization pulse to said electromagnetic means for producing said first energized state for unblocking said shutter in response to the closing of said shutter release switch and for providing thereafter a resetting pulse to said electromagnetic means for producing said second energized state for blocking said shutter, said resetting pulse being produced only when one of said switches is open while said motor is energized.

4. An electromagnetic shutter releasing device as set forth in claim 3 wherein said control circuit further comprises a repetitive timing circuit having an enabled condition for restarting said multivibrator at regular intervals while said shutter release switch remains closed, and also switch means for providing said enabled condition of said timing circuit.

5. An electromagnetic shutter releasing device as set forth in claim 3 wherein said control means further comprises an external connection member connected to said shutter release switch for remote generation of shutter release signals.

6. An electromagnetic shutter releasing device as set forth in claim 3 wherein a second source of electrical energy is provided, so that one of said sources of electrical energy is arranged for energization of said control means and said electromagnetic means and the other of said source is arranged for energization of said motor.

7. An electromagnetic shutter releasing device as set forth in claim 3 wherein said setting and resetting pulses energize said electromagnetic means in opposite polarity and wherein said electromagnetic means further comprises:

a permanent magnet member;

an electromagnetic member poled at right angles to said permanent magnet member; and a yoke structure and a displaceable armature having two extreme positions said armature being displaceable with respect to said yoke structure and being arranged so as to be displaced alternately to one of said two extreme positions two extreme positions by energiztion of said electromagnetic member by one or the other energization said pulses.

8. An electromagnetic shutter releasing device as set forth in claim 3 wherein said electromagnetic means further comprises:

an inner magnetic having two arms;

an outer magnetic having two arms;

a permanent magnet member held between said yokes;

an electromagnetic member between the arms of said inner yoke and poled at right angles to said permanent magnet member; and a second shaft passing axially through said electromagnetic member; and an armature member comprising two armature bodies mounted on said second shaft so that said armature bodies are displaceable together, each between an arm of said inner yoke and an arm of said outer yoke, said armature bodies being alternatively displaceable in one of two directions according to the polarity of energization of said electromagnetic member.

9. An electromagnetic shutter releasing device as set forth in claim 7 wherein said blocking means comprises:

a stopper member, and a cam member, said stopper member being coupled to said armature and actuatable thereby, said cam member being directly coupled to said motor, and the blocking of said shutter upon actuation of said electromagnetic member by said resetting pulse taking place only when said cam is in or reaches a rotary position in which it engages said stopper whereas the unblocking of said shutter takes place immediately on actuation of said electromagnetic member by said setting pulse.

* * * * *